United States Patent Office 2,791,572
Patented May 7, 1957

2,791,572
RUBBER TREATMENT

Kenneth W. Doak, Bloomfield, N. J., assignor to United States Rubber Company, New York, N. Y., a corporation of New Jersey No Drawing. Application November 16, 1953, Serial No. 392,484

10 Claims. (Cl. 260—41.5)

This invention relates to improvements in the technique of processing high carbon black-rubber mixes prior to vulcanization thereof, and more particularly to improvements in so-called "low-hysteresis" processing of mixtures of carbon black and rubber.

The technique of processing high carbon black and rubber mixes prior to vulcanization thereof, whereby to obtain vulcanizates with improvements in physical and chemical properties, is described in Gerke et al. U. S. P. 2,118,601. The improved vulcanizates prepared by the technique Gerke et al. differ from the usual vulcanizates produced by older techniques in that they have relatively (1) lower modulus at low elongation, (2) higher modulus above 300° elongation, (3) higher resistance to abrasion, (4) lower torsional hysteresis, and (5) higher electrical resistivity, and are (6) relatively softer.

These improved vulcanizates are obtained, in accordance with the Gerke et al. technique, by incorporating in the rubber a relatively large amount of carbon black, for example, at least 25 parts, and preferably in the case of tire treads at least 40 parts by weight of carbon black per 100 parts by weight of rubber, and then subjecting a substantially homogeneous mixture of the ingredients to a heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, and particularly within the preferred temperature range.

An object of the present invention is to provide new chemical promoters for the processing of rubber and carbon black mixes as described in U. S. P. 2,118,601 whereby to obtain high electrical resistance and low torsional hysteresis of tread stocks. A further object is to provide substantial decreases in the time of the low-hysteresis processing by the use of the herein disclosed chemicals with consequent increase in the capacity and output of equipment. Other objects will appear more fully hereinafter.

I have found that aromatic sulfonyl chlorides substantially decrease the time and temperature for low hysteresis processing. These aromatic sulfonyl chlorides may be represented by R—SO$_2$Cl, where R is a phenyl or naphthyl group or a phenyl or naphthyl group substituted by one or more alkyl groups, nitro groups, acetylamino groups, ester groups, or halogens. Specific examples of these aromatic sulfonyl chlorides are: benzenesulfonyl chloride, p-toluenesulfonyl chloride, o-toluenesulfonyl chloride, p-nitrobenzenesulfonyl chloride, 2,5-dichlorobenzenesulfonyl chloride, 4-acetylaminobenzenesulfonyl chloride, p-bromobenzenesulfonyl chloride, 3,4-dichlorobenzenesulfonyl chloride, 1,3-dimethylbenzene-4-sulfonyl chloride, naphthalene-beta-sulfonyl chloride, and naphthalene-alpha-sulfonyl chloride.

These promoters are effective in natural rubber, synthetic rubbery homopolymers of aliphatic conjugated diolefin hydrocarbons, especially butadiene and isoprene, and synthetic rubbery copolymers of such diolefin hydrocarbons with copolymerizable monoolefinic compounds, such as isobutylene, styrene, alpha-methyl styrene, ethyl acrylate, acrylonitrile, methyl methacrylate, methyl acrylate, methyl vinyl ketone, methyl isopropenyl ketone, and mono-vinyl pyridines. They are particularly effective in natural rubber, in copolymers of a major proportion, typically from 90 to 99.5, of isobutylene and a minor proportion, typically correspondingly from 10 to 0.5%, of an aliphatic conjugated diolefin hydrocarbon, especially butadiene or isoprene (known commercially as "Butyl rubber"), and in copolymers of butadiene and styrene (known as GR-S).

The process of my invention comprises mixing natural rubber or a synthetic rubbery polymer of an aliphatic conjugated diolefin, i. e., an aliphatic conjugated diolefin homopolymer or copolymer, with a relatively large amount of a rubber-reinforcing carbon black and a relatively small but effective amount, typically from 1 to 3 parts per 100 parts of rubbery material, of an aromatic sulfonyl chloride, and heating this mixture at a temperature of from 275° F. to a temperature just short of that at which the rubber would be injured, to bring about the desired changes in the rubber-and-carbon black mixture whereby a vulcanizate of this mixture will have a considerably reduced torsional hysteresis and a considerably increased electrical resistivity. This heat treatment is carried out in the absence of vulcanizing agents, e. g., sulfur or sulfur-yielding compounds. Following the heat treatment, the vulcanizing and other desired compounding ingredients including conventional accelerators and the like are intimately incorporated in the conventional manner, after which the mixture is shaped and vulcanized in the usual way.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as great as 100 parts per 100 parts of rubber.

In the preferred practice of my invention, the heat treatment of the mixture of rubber, carbon black and aromatic sulfonyl chloride is carried out by mastication at temperatures in the range of 275–400° F., and more preferably in the range of 300–400° F., with any suitable type of masticating equipment such as an open two-roll rubber mill or more preferably an internal rubber mixer, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary depending upon many factors, including the temperature of heat treatment, type of heat treatment, i. e., whether it is static or dynamic, type of equipment used, e. g., in the case of masticatory heat treatment whether an open rubber mill or a Banbury or other type of internal mixer is used, amount of aromatic sulfonyl chloride used, etc. In any event, the treating time will be considerably shorter, at given temperature conditions, than the time required when the aromatic sulfonyl chloride is omitted. In the case of the preferred masticatory treatment, times of the order of 5 to 30 minutes will generally be adequate for the purposes of my invention, the longer times being used at the lower temperatures and vice versa. It is well known that different rubbers vary as to the highest temperatures they can withstand without harm and the time and temperature should of course be so regulated as to not impair the properties of the final vulcanizate.

It is preferable to form an intimate mixture of the rubber, carbon black and aromatic sulfonyl chloride at a relatively low temperature, i. e., below 275° F., in order to avoid premature reaction of the aromatic sulfonyl chloride whereby its promoting effect upon the low hysteresis processing would be seriously reduced.

The following examples illustrate the preferred methods of practicing the invention. All parts are by weight.

EXAMPLE 1

A masterbatch is prepared by mixing together 100 parts Hevea rubber, 50 parts carbon black (a medium processing channel black known as "Spheron-6") and 5 parts stearic acid. This mixing operation is carried out in the conventional manner in a Banbury mixer or a two roll rubber mill. To 155 parts of this masterbatch is added 2.2 parts p-nitrobenzenesulfonyl chloride on a two roll rubber mill at a temperature preferably below 275° F. The mill temperature is then raised to 300° F., and the mixture is masticated for ten minutes. Thereafter the mill is cooled to 150–200° F. and 2 parts of pine tar, 2 parts of zinc oxide, 1 part of antioxidant, 1 part of accelerator, and 2.6 parts of sulfur are incorporated. The mixture is placed in a suitable mold and vulcanized 45 minutes at 287° F. As a control an identical masterbatch is prepared and subjected to all the previously described manipulative steps except that no p-nitrobenzenesulfonyl chloride is added to the mixture. The specific electrical resistivity and torsional hysteresis are determined for the two vulcanizates, with the following results:

|  | Log Resistivity | Tors. Hyst., 280° F. |
|---|---|---|
| Control | 7.2 | 0.127 |
| Sample with p-nitrobenzene-sulfonyl chloride | >13.0 | 0.061 |

The practice of the invention thus increases the specific resistivity by a factor greater than 600,000, and reduces the torsional hysteresis at 280° by over 50%.

In the absence of a chemical promoter, times of 30 to 60 minutes, at temperatures of 325–350° F., would be required to obtain the above results.

EXAMPLE 2

An experiment is carried out in a manner identical with that of Example 1, except that 1.9 parts of p-toluenesulfonyl chloride or 2.0 parts benzenesulfonyl chloride is used in place of the p-nitrobenzenesulfonyl chloride. The following results are obtained:

|  | Log Resistivity | Tors. Hyst., 280° F. |
|---|---|---|
| Control | 7.9 | 0.121 |
| Sample with p-toluenesulfonyl chloride | 12.4 | .091 |
| Sample with benzenesulfonyl chloride | 13.0 | .073 |

EXAMPLE 3

Two parts of p-toluenesulfonyl chloride is added to a masterbatch of 100 parts of a butadiene-styrene copolymer (GR–S polymerized in emulsion at 41° F.), 52 parts of carbon black (a medium processing channel black), 6 parts of hydrocarbon oil and one part of stearic acid. High temperature mastication is carried out in a laboratory Banbury mixer for 6 minutes at 325° F. Thereafter, 3 parts of zinc oxide, 1 part of 2-mercaptobenzothiazole, 0.4 part of diphenylguanidine, and 2 parts of sulfur are incorporated on a two-roll mill. The stock is vulcanized 45 minutes at 293° F. As a control, an identical masterbatch is treated in the same manner, except that no p-toluenesulfonyl chloride is used. The results are shown below.

|  | Log Resistivity | Tors. Hyst., 280° F. |
|---|---|---|
| Sample with p-toluenesulfonyl chloride | 12.7 | 0.098 |
| Control | 8.5 | 0.151 |

P-toluenesulfonyl chloride thus reduces the torsional hysteresis and increases the specific electrical resistivity of a mixture of carbon black and a rubbery copolymer of butadiene and styrene (GR–S).

EXAMPLE 4

A masterbatch is prepared by mixing in a conventional manner 100 parts of an isobutylene-isoprene copolymer (known commercially as "Butyl-15") and 50 parts of carbon black (a medium processing channel black). Various aromatic sulfonyl chlorides are added to portions of the masterbatch at 150–275° F. The mixtures are then masticated at a high temperature in a laboratory Banbury mixer for 15 minutes. Thereafter, 3 parts of stearic acid, 3 parts of zinc oxide, one part of tetramethylthiuram disulfide, 0.5 part of 2-mercaptobenzothiazole, and 2 parts of sulfur (per 100 of rubber) are incorporated in each mixture on a two-roll mill at a temperature of 150–200° F. The stocks are vulcanized 60 minutes at 293° F. The data are summarized in Table II.

*Table II*

| Chemical Used | Parts | Temp., °F. | Time of Mastication, min. | Log R | Tors. Hyst., 280° F. | ML-4 [1] (raw) |
|---|---|---|---|---|---|---|
| None (control) | | 375 | 15 | 6.3 | .195 | 74 |
| p-Toluenesulfonyl chloride | 1.5 | 375 | 15 | >13.0 | .099 | 61 |
| p-Nitrobenzenesulfonyl chloride | 1.5 | 300 | 15 | 6.7 | .268 | 75 |
| Do | 1.5 | 325 | 15 | 12.2 | .117 | 66 |
| Do | 1.5 | 350 | 15 | 12.0 | .113 | 66 |
| Do | 1.5 | 375 | 15 | 12.4 | .105 | 56 |
| Naphthalene-beta-sulfonyl chloride | 1.5 | 375 | 15 | 12.6 | .109 | 66 |

[1] Mooney viscosity, large rotor, 4' at 212° F.

Table II shows that aromatic sulfonyl chlorides reduce the torsional hysteresis and increase the specific electrical resistivity of mixtures of carbon black and a copolymer of isobutylene and isoprene ("Butyl rubber"). It will be seen that the higher temperatures, i. e., 325° F. or above, are more effective in the case of Butyl rubber.

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black and aromatic sulfonyl chloride in any suitable manner and then heat this mixture at 275–400° F. without simultaneously masticating it, the heat-treated mixture being subsequently masticated and compounded with conventional compounding and vulcanizing ingredients followed by shaping and vulcanizing in the usual way. The static heat-treatment can be conducted by placing slabs of the stock in an oven heated to a suitable temperature, or slabs of hot stock can be stacked up and allowed to stand for several hours, preferably under relatively non-heat-conductive conditions, in order to maintain the mixture at the temperature of 275–400° F. for as long as reasonably possible. If desired, the slabs can be wrapped with a suitable insulating blanket to cause prolonged retention of heat. Such static heat-treatment has the advantage of releasing the Banbury equipment from use for carrying out the heat-treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Aryton shunt. The logarithm (to base 10) of the specific electrical resistivity (expressed in ohm-cms.) is designated "Log Resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al., 2,118,601.

Having thus described my invention, what I claim and desire to protect by Letters Patent is:

1. A process which comprises mixing rubber selected from the group consisting of natural rubber and synthetic rubbery polymers of aliphatic conjugated diolefins with a relatively large amount of rubber-reinforcing carbon black and from 1 to 3 parts, per 100 parts of said rubber, of an aromatic sulfonyl chloride having the formula R—SO₂Cl, where R is selected from the group consisting of phenyl, naphthyl, and phenyl and naphthyl substituted by at least one alkyl group, nitro group, acetylamino group, ester group, and halogen, heating the mixture at a temperature of at least 275° F. but below that at which the rubber would be harmed, thereafter incorporating vulcanizing and other desired ingredients, shaping the mass, and vulcanizing the resulting shaped mass.

2. A process which comprises mixing rubber selected from the group consisting of natural rubber and synthetic rubbery polymers of aliphatic conjugated diolefins with a relatively large amount of rubber-reinforcing carbon black and from 1 to 3 parts, per 100 parts of said rubber, of an aromatic sulfonyl chloride having the formula R—SO₂Cl, where R is selected from the group consisting of phenyl, naphthyl, and phenyl and naphthyl substituted by at least one alkyl group, nitro group, acetylamino group, ester group, and halogen, masticating the mixture at a temperature of from 275° to 400° F., thereafter incorporating vulcanizing and other desired ingredients, shaping the mass, and vulcanizing the resulting shaped mass.

3. A process which comprises mixing natural rubber with a relatively large amount of a rubber-reinforcing carbon black and from 1 to 3 parts, per 100 parts of said rubber, of an aromatic sulfonyl chloride having the formula R—SO₂Cl, where R is selected from the group consisting of phenyl, naphthyl, and phenyl and naphthyl substituted by at least one alkyl group, nitro group, acetylamino group, ester group, and halogen, masticating the mixture at a temperature of from 275 to 400° F., thereafter incorporating vulcanizing and other desired ingredients, shaping the mass, and vulcanizing the resulting shaped mass.

4. A process which comprises mixing a rubbery copolymer of butadiene and styrene with a relatively large amount of a rubber-reinforcing carbon black and from 1 to 3 parts, per 100 parts of said copolymer, of an aromatic sulfonyl chloride having the formula R—SO₂Cl, where R is selected from the group consisting of phenyl, naphthyl, and phenyl and naphthyl substituted by at least one alkyl group, nitro group, acetylamino group, ester group, and halogen, masticating the mixture at a temperature of from 275 to 400° F., thereafter incorporating vulcanizing and other desired ingredients, shaping the mass, and vulcanizing the resulting shaped mass.

5. A process which comprises mixing a rubbery copolymer of isobutylene and an aliphatic conjugated diolefin with a relatively large amount of a rubber-reinforcing carbon black and from 1 to 3 parts, per 100 parts of said copolymer, of an aromatic sulfonyl chloride having the formula R—SO₂Cl, where R is selected from the group consisting of phenyl, naphthyl, and phenyl and naphthyl substituted by at least one alkyl group, nitro group, acetylamino group, ester group, and halogen, masticating the mixture at a temperature of from 325 to 400° F., thereafter incorporating vulcanizing and other desired ingredients, shaping the mass, and vulcanizing the resulting shaped mass.

6. A process which comprises mixing natural rubber with a relatively large amount of a rubber-reinforcing carbon black and from 1 to 3 parts of p-nitrobenzenesulfonyl chloride per 100 parts of said rubber, masticating the mixture at a temperature of from 275 to 400° F., thereafter incorporating vulcanizing and other desired ingredients, shaping the mass, and vulcanizing the resulting shaped mass.

7. A process which comprises mixing natural rubber with a relatively large amount of a rubber-reinforcing carbon black and from 1 to 3 parts of p-toluenesulfonyl chloride per 100 parts of said rubber, masticating the mixture at a temperature of from 275 to 400° F., thereafter incorporating vulcanizing and other desired ingredients, shaping the mass, and vulcanizing the resulting shaped mass.

8. A process which comprises mixing a rubbery copolymer of butadiene and styrene with a relatively large amount of a rubber-reinforcing carbon black and from 1 to 3 parts of p-toluenesulfonyl chloride per 100 parts of said copolymer, masticating the mixture at a temperature of from 275 to 400° F., thereafter incorporating vulcanizing and other desired ingredients, shaping the mass, and vulcanizing the resulting shaped mass.

9. A process which comprises mixing a rubbery copolymer of isobutylene and an aliphatic conjugated diolefin with a relatively large amount of a rubber-reinforcing carbon black and from 1 to 3 parts of p-toluenesulfonyl chloride per 100 parts of said rubbery copolymer, masticating the mixture at a temperature of from 325 to 400° F., thereafter incorporating vulcanizing and other desired ingredients, shaping the mass, and vulcanizing the resulting shaped mass.

10. A process which comprises mixing a rubbery copolymer of isobutylene and an aliphatic conjugated diolefin with a relatively large amount of a rubber-reinforcing carbon black and from 1 to 3 parts of p-nitrobenzenesulfonyl chloride per 100 parts of said rubbery copolymer, masticating the mixture at a temperature of from 325 to 400° F., thereafter incorporating vulcanizing and other desired ingredients, shaping the mass, and vulcanizing the resulting shaped mass.

References Cited in the file of this patent

UNITED STATES PATENTS 2,118,601   Gerke et al. _____ May 24, 1938